(12) United States Patent
Kulczyk et al.

(10) Patent No.: US 7,840,370 B2
(45) Date of Patent: Nov. 23, 2010

(54) METHOD AND APPARATUS FOR MONITORING THE ROTATIONAL SPEED OF SHAFT

(75) Inventors: Wojciech Konrad Kulczyk, Hampshire (GB); Anthony Palmer, Hampshire (GB); Matthew Clifton-Welker, Hampshire (GB)

(73) Assignee: Weston Aerospace Limited, Hampshire (GB)

( * ) Notice: Subject to any disclaimer, the term of this patent is extended or adjusted under 35 U.S.C. 154(b) by 0 days.

(21) Appl. No.: 12/318,029

(22) Filed: Dec. 19, 2008

(65) Prior Publication Data
US 2009/0177433 A1 Jul. 9, 2009

(30) Foreign Application Priority Data
Dec. 21, 2007 (GB) .................. 0725076.4
Dec. 21, 2007 (GB) .................. 0725078.0

(51) Int. Cl.
*G01P 3/00* (2006.01)
*G01N 27/72* (2006.01)

(52) U.S. Cl. ...................... 702/145; 324/233

(58) Field of Classification Search ................ 702/145, 702/148, 149; 324/173, 229, 233
See application file for complete search history.

(56) References Cited

U.S. PATENT DOCUMENTS

| 3,984,713 | A | 10/1976 | Presley |
| 4,037,157 | A | 7/1977 | Campbell |
| 4,358,828 | A | 11/1982 | Reid et al. |
| 4,814,704 | A | 3/1989 | Zerrien, Jr. et al. |
| 4,902,970 | A | 2/1990 | Suquet |
| 4,967,153 | A | 10/1990 | Langley |
| 5,170,365 | A | 12/1992 | Callopy et al. |
| 5,400,268 | A | 3/1995 | Katsuda et al. |
| 5,541,859 | A * | 7/1996 | Inoue et al. ................ 702/148 |
| 5,559,705 | A | 9/1996 | McClish et al. |
| 5,703,283 | A | 12/1997 | McClish et al. |
| 5,747,680 | A | 5/1998 | McArthur |
| 5,942,893 | A * | 8/1999 | Terpay .................. 324/207.18 |
| 6,225,770 | B1 | 5/2001 | Heinrich et al. |

(Continued)

FOREIGN PATENT DOCUMENTS

DE  197 29 981  1/1999

(Continued)

OTHER PUBLICATIONS

Related U.S. Appl. No. 12/318,031, filed Dec. 19, 2008, Kulczyk et al.

(Continued)

*Primary Examiner*—Bryan Bui
(74) *Attorney, Agent, or Firm*—Nixon & Vanderhye P.C.

(57) ABSTRACT

Method and apparatus for monitoring the rotational speed of a shaft, in particular a shaft having a number of spaced features on or rotating with the shaft. Preferred embodiments of the invention are concerned with methods and apparatuses for processing signals in order to calculate, with high accuracy and a fast response time, the rotational speed of a gas turbine shaft. The invention recognizes that it is possible to accurately measure speed between two eddy current sensors (5, 6) by determining the time take for a turbine blade to pass therebetween provided that appropriate compensation is made for the effect of apparent changes in the magnetic distance between the sensors.

20 Claims, 6 Drawing Sheets

U.S. PATENT DOCUMENTS

| | | | |
|---|---|---|---|
| 6,462,535 B1 * | 10/2002 | Schwabe | 324/164 |
| 2002/0125880 A1 | 9/2002 | Murai et al. | |
| 2004/0083800 A1 | 5/2004 | Yonezawa et al. | |
| 2005/0127905 A1 * | 6/2005 | Proctor et al. | 324/207.15 |
| 2006/0015288 A1 | 1/2006 | Ai et al. | |
| 2007/0044548 A1 | 3/2007 | Ishizauka et al. | |

FOREIGN PATENT DOCUMENTS

| | | |
|---|---|---|
| DE | 197 36 712 | 2/1999 |
| DE | 100 17 107 | 10/2001 |
| EP | 0 310 823 | 4/1989 |
| EP | 0 169 670 | 3/1993 |
| EP | 1 189 065 | 3/2002 |
| EP | 0 846 951 | 9/2002 |
| EP | 1 564 559 | 8/2005 |
| GB | 1386035 | 3/1975 |
| GB | 2198241 | 6/1988 |
| GB | 2223103 | 3/1990 |
| GB | 2265221 | 9/1993 |
| GB | 2 281 624 | 3/1995 |
| GB | 2414300 | 11/2005 |
| WO | WO 92/19977 | 11/1992 |
| WO | WO 00/08475 | 2/2000 |
| WO | WO 01/77692 | 10/2001 |
| WO | WO 03/070497 | 8/2003 |

OTHER PUBLICATIONS

Related U.S. Appl. No. 12/318,032, filed Dec. 19, 2008, Kulczyk et al.
EP Search Report dated Sep. 23, 2009 for EP 08254075.8.
EP Search Report dated Apr. 16, 2009 for EP 08254075.8.
EP Search Report dated May 4, 2009 for EP 08254077.4.
EP Search Report dated May 4, 2009 for EP 08254078.2.
EP Search Report dated May 4, 2009 for EP 08254076.6.
UK Search Report dated Apr. 8, 2008 for GB 0725076.4.
UK Search Report dated Mar. 27, 2008 for GB 0725078.0.
UK Search Report dated Mar. 25, 2008 for GB 0725072.3.
UK Search Report dated Mar. 26, 2008 for GB 0725073.1.

* cited by examiner

METHOD AND APPARATUS FOR MONITORING THE ROTATIONAL SPEED OF SHAFT

This application claims priority to Great Britain Application No(s). 0725076.4, filed 21 Dec. 2007, and 0725078.0, filed 21 Dec. 2007 the entire contents of each of which are hereby incorporated by reference.

The present invention is concerned with method and apparatus for monitoring the rotational speed of a gas turbine shaft having a number of electrically conductive spaced features on or rotating with the shaft. Preferred embodiments of the invention are concerned with methods and apparatuses for processing signals in order to calculate, with high accuracy and a fast response time, the rotational speed of a gas turbine shaft. Embodiments of the invention are applicable to both jet engines and industrial gas turbines.

Particular preferred embodiments of the invention that are described below in more detail may be used to generate a sequence of outputs or signals which represent the rotational speed of a gas turbine shaft. Preferred embodiments of the invention easily and effectively compensate for blade jitter and missing pulses or blades when used to process signals from a speed sensor in order to monitor the speed of a rotating turbine shaft.

The speed of a rotating gas turbine shaft is typically monitored by monitoring the movement of a magnetic toothed phonic or tone wheel which rotates with the gas turbine shaft. A magnetic speed probe monitors the changes in a magnetic field as a tooth passes through it. The passage of each tooth generates a probe signal pulse or signal peak and the probe signal train is used to calculate the rotational speed of the toothed wheel by measuring the time between successive pulses, or counting a number of pulses in a fixed time. The rotational speed of the gas turbine shaft is then derived from the speed of the phonic or tone wheel.

There is no easy access to the turbine shaft, so the toothed or phonic wheel is typically at a distance from the shaft and connected thereto via a long gear train. A big disadvantage of such a system is that the gear train is expensive and heavy, and can only be replaced during a major engine overhaul. An alternative to the remote phonic wheel coupled to the turbine shaft by a gear train is to mount the phonic wheel directly on the shaft. However this requires additional space inside the engine for the wheel and probe fixture.

Eddy current sensors such as that disclosed in GB 2,265,221 can also be mounted on the outside of an engine and used to measure the rotational speed of a gas turbine shaft by directly monitoring movement of the blades mounted on the rotating shaft. If the separation between blades is known, then the rotational speed can be determined from the time between successive signal pulses where each signal pulse corresponds to passage of blade past the sensor.

Patent numbers GB 2,265,221, GB 2,223,103, U.S. Pat. No. 3,984,713 and GB 1,386,035 each describe eddy current or inductive sensors which may be used to measure the rotational speed of a bladed shaft. The sensors described in these documents are speed or torque sensors, each comprising a magnet positioned so that the tips of the blades pass in close proximity to the magnet. When a blade is moving close to the sensor magnet, eddy currents are generated in the tip of the blade. These eddy currents generate their own magnetic fields which are detected by a coil located in the sensor. A rotating shaft with blades, such as that in a gas turbine, will therefore generate a series of pulses with the period between pulses representing the period between successive blades as they pass the sensor. The series of pulses can be used to determine the speed of the rotating shaft; the speed is calculated from the time measurements between the pulses.

It is possible to use other types of sensors, such as optical, capacitive or RF (radio frequency) sensors, but these sensors cannot operate through the turbine casing and require direct access to the blades through a hole in the casing. This requires a hole through the turbine casing.

A method of calculating shaft speed by measuring a time interval between consecutive blades passing a single sensor has been described in GB 2,414,300. The inventors of the subject application are the first to realise that the method described in GB 2,414,300 is not suitable for shaft speed measurement when a fast response time is required at low shaft speeds. Effective operation of the predictor-limiter method described in GB 2,414,300 requires processing of time information from several time intervals and, especially when the rotational speed of the shaft is low, the response time of the system can be very slow. This is clearly problematic in applications where response time and accuracy are critical.

It is known that the speed of a moving object (e.g. a turbine blade or the tooth of a phonic wheel) can be determined by measuring the time taken for that object to pass from one sensor or monitoring station to another sensor or monitoring station. However, such speed measuring arrangements which use measurement of the "time of flight" between two points require one to know the distance between the two points. This has meant that such "time of flight" measurement systems have been considered unsuitable for measuring speed in environments or systems where the distance between the two sensors varies, such as in, for example, separate spaced magnetic sensors such as eddy current sensors.

The distance between two spaced sensors depends on the physical spacing of the two sensors and can vary due to thermal expansion of the sensor(s) mounting fixture. Furthermore when the sensors are magnetic sensors such as eddy current sensors, we need to consider the effective distance which is the distance between the points at which a passing blade or projection generates a signal peak or pulse zero crossing. This distance also depends on the magnetic field geometry of the sensors and blades or projections. This magnetic geometry depends on several parameters such as the dimensions of the coil, magnet, and/or blades, as well as the electrical and magnetic properties of the blade and magnet material, and their dependence on temperature. The inventors estimate that the variations in magnetic distance are an order of magnitude higher than the errors arising from thermal expansion. The magnetic distance errors or variations are therefore highly significant. Since some of these properties are difficult to measure and all of them vary, time of flight measurements have been considered unsuitable for systems using eddy current sensors in environments such as gas turbines where the distance between the sensors will vary and accurate measurements are desired.

Time of flight method based on the measuring time between two pulses generated by two sensors spaced at a certain distance is commonly used for rotational speed measurements where a distance between two sensors is known and constant. The invention of the subject application is concerned with a measuring system where the distance is known only approximately and is varying with time.

The proposed solution results from a need to measure rotational speed with a very high accuracy of the order of 0.1%, and a very fast response time, much less than one revolution. Therefore there is a need to not only measure time between the pulses with high accuracy but to know the distance with a very high accuracy. It is known that the distance used to calculate the speed of rotation does not only depend on the physical distance between the sensors but also on the magnetic distance between the sensors.

The magnetic distance is difficult to define and impossible to measure directly. It could be described as a physical distance between the two sensors to generate signal pulses in such a way that for the known speed, v and time measurements, t, magnetic distance s is given by $$s = v \times t$$

Since we know that in practice distance s changes very slowly therefore in the subject invention one can determine the distances from the independent speed measurements multiplied by the time interval between the pulses.

The known time of flight applications are not concerned with a very high accuracy, fast response time of shaft speed measurements using magnetic sensors.

The present invention in its various aspects provides systems and methods as defined in the independent claims to which reference should now be made. Some preferred features of the invention are set out in the dependent claims to which reference should also now be made.

Preferred embodiments of the present invention will be described, by way of example only, with reference to the attached figures. The figures are only for the purposes of explaining and illustrating a preferred embodiment of the invention and are not to be construed as limiting the claims. The skilled man will readily and easily envisage alternative embodiments of the invention in its various aspects.

In the figures:

FIGS. 2a and 2b are a schematic illustration of two speed sensors set up to determine the time of flight period of successive tips of the blades of a turbine as they move across the spacing between two sensors from the first sensor to the second sensor, in which FIG. 2a illustrates the sensor arrangement and FIG. 2b the output signal pulse trains from the sensors;

In a preferred embodiment of the present invention, the speed of a gas turbine shaft having, say, twenty-nine compressor blades mounted thereon is calculated based on measurements from two speed sensors such as the eddy current sensor type described in GB 2,265,221. The sensors note the passage of a blade past them and a counter or timer connected to their outputs determines the time interval between the passage of a blade past the two sensors; i.e. the time it takes for the blade to travel between the sensors. The data processing apparatus may be a digital engine control unit.

Figure 1A:
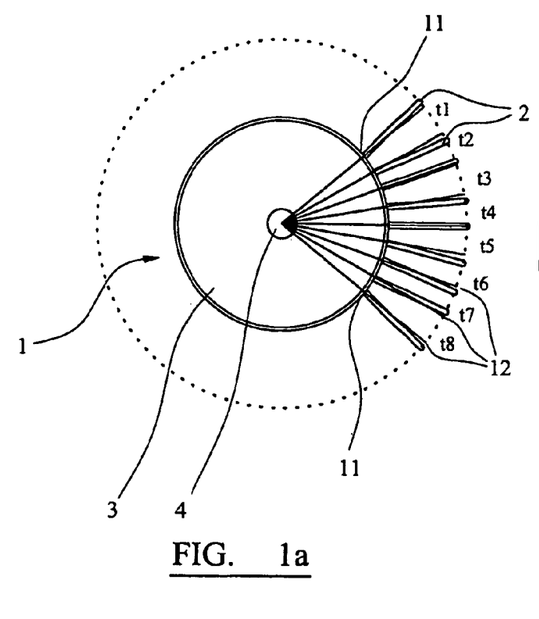
FIGS. 1a and 1b are a schematic illustration of a known speed sensor arrangement set up to determine the time intervals between successive tips of the blades of a turbine as they move past the sensor, with FIG. 1a illustrating the sensor arrangement and FIG. 1b the output signal train from the sensor.
Figure 1B:
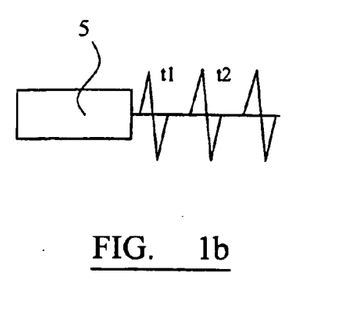

Referring to FIG. 1 showing a bladed gas turbine shaft 1, a shaft 4 has a disc 3 connected thereto. The disc has twenty-nine blades 2 (not all shown) fixed thereto at equal points spaced around the shaft's circumference. Each blade 2 is fixed to the disc by a pin (not shown). Each blade 2 can therefore move or swivel about its pin in a range of about +/−20 degrees. This movement is known as jitter and can give rise to measurement errors.

Speed sensors 5, 6 (see FIGS. 2 and 3) are located near the path of the rotating blades and note the passage of each blade tip as it passes each of the sensors. Each sensor produces a pulse or a signal peak (see FIGS. 1 to 3) as a tip passes it.

In this text, reference is made to signal pulse or peak. For a magnetic sensor, what happens is that as a feature approaches and then moves away from the sensor, a signal similar to a single sine wave results (i.e. having positive and negative peaks). The position of the pulse for the purposes of the described embodiments is usually taken to be the zero crossing point between the positive and negative peaks. Time periods are measured between respective zero crossings.

A data processor (not shown) is coupled to the speed sensors 5, 6 which receives as an input the sequence of pulses generated by each of the sensors. There may be significant noise produced by the jitter effect, and missing pulses.

Figure 3:
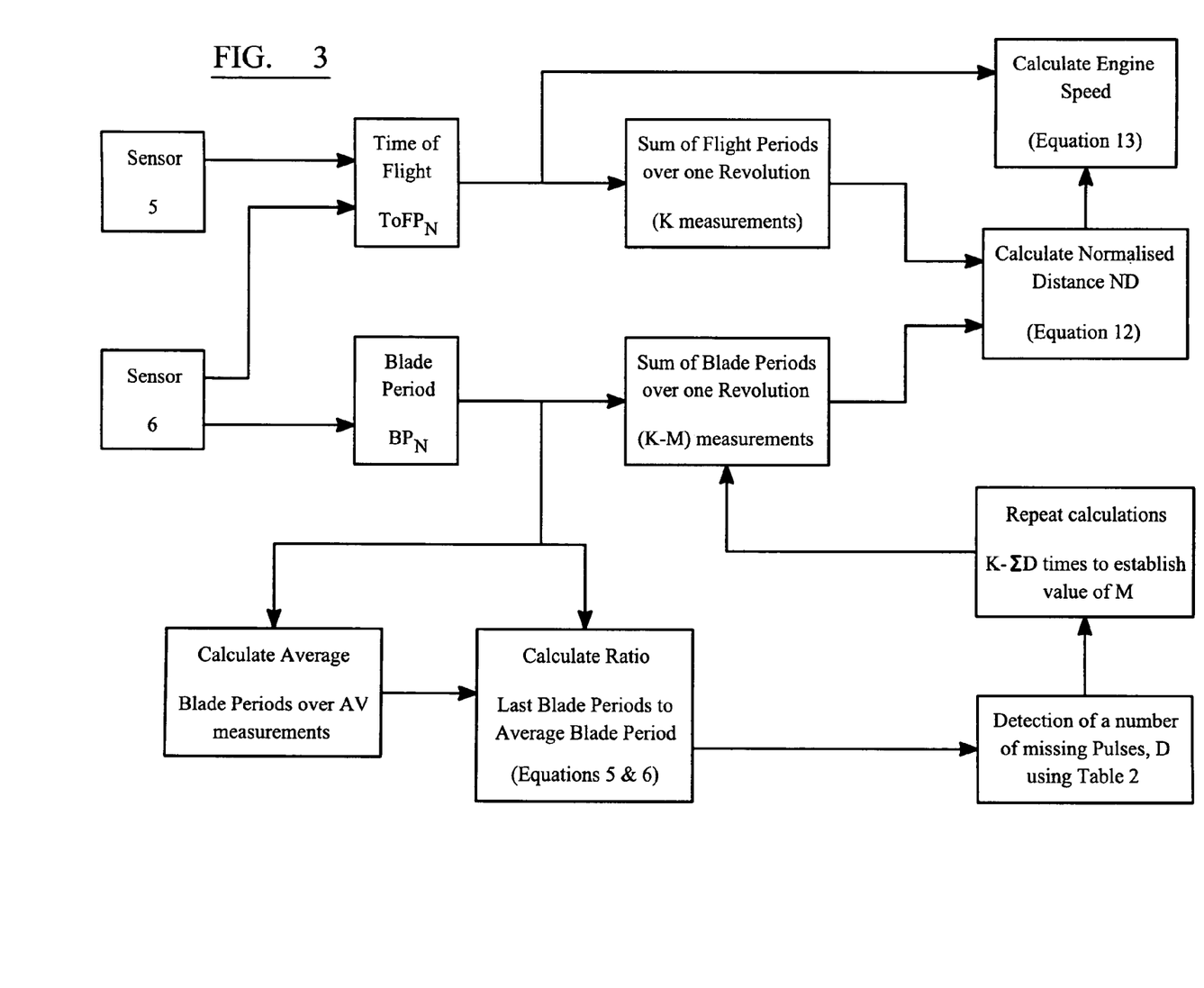
FIG. 3 is a block diagram illustrating a system embodying the present invention.

As illustrated in FIG. 3 and discussed in more detail below, the system measures the time taken for a blade to pass from the first sensor 5 to the second sensor 6 by noting the time of flight ToF between the pulses generated at the respective sensors by the blade. In order to then determine the rotational speed it is necessary to determine the distance between the two sensors 5, 6. A measure of distance between sensors is derived by summing the times of flights for a number of successive blades then dividing that time by the sum of the corresponding blade periods to obtain a coefficient which is a measure of the relative proportion of the distance between the sensors to the distance between blades.

The data processor coupled to the speed sensors 5, 6 includes a counter which determines the time interval between successive signal pulses (t(1), t(2), see FIG. 1) produced by one of the sensors e.g. sensor 5. The time interval between the successive signals at sensor 5 provides the blade period $BP_N$ (see FIG. 3) These time intervals may be stored in a memory.

Figure 2A:
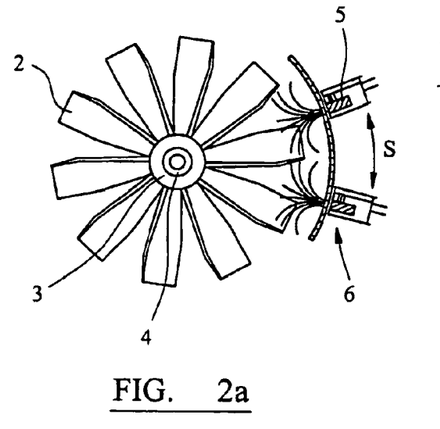

The data processor also determines the time needed for a single blade to travel between sensors 5 and 6 spaced by distance S (FIG. 2). This time interval provides the time of flight period $T_OF_N$ for the Nth blade (see FIG. 3). These time intervals are also stored in the memory.

The spacing, S, between the two sensors 5 and 6 should be large enough to achieve the required accuracy of time measurements for a given clock frequency. In practice, S is limited by the available physical space in an application and is typically between 1 and 2 times the spacing between adjacent turbine blades. A preferred value of S is about 1.36 times the blade spacing where the blade tips pass sensor 5 and then pass sensor 6 after a normalised period of 1.36. If the spacing is 1 or 2, pulses from different sensors would come in at the same time to the processor for the Time of Flight calculation. A spacing of 1.5 would therefore be optimal from the point of view of reducing delay in processing the signals. However as both sensors 5, 6, will typically be in a single "sensor box", and it is desirable to keep the box as small as possible, a 1.36 spacing is a compromise.

As mentioned above, to monitor the shaft rotational speed it is necessary to know very accurately the distance, S, between the two sensors 5, 6. This distance depends on the mechanical spacing of the two sensors as discussed above and can vary due to the thermal expansion of the sensor mounting fixture. When the sensors are eddy current sensors, this distance also depends on the magnetic field geometry of the sensors and the blades. This magnetic geometry depends on several parameters such as the coil, magnet, blade dimensions, blade and magnet material, magnetic and electrical properties and their dependence on temperature. Since these properties vary with time as, for example, blade thickness changes due to wear and the magnetic properties vary with temperature, it is necessary to repeatedly calibrate (and then recalibrate) the distance S.

The data processor and associated circuitry is used to calculate from the time of flight period measurements, the average blade speed over the distance between the sensors (i.e. ToF) 5, 6, by:

$$V = S/T \quad (1)$$

Where: V is the average blade speed;
T is the time needed by one blade to travel between the two sensors, and
S is the distance between the two sensors.

In order to determine a measure for the spacing 5, 6 between the sensors; a normalised distance, ND, between the sensors is calculated. This can be defined as a ratio of the distance between the sensors, S, to the nominal spacing between the turbine blades.

The normalised distance ND, is the ratio of the cumulative total of the time of flight periods over a selected number K of the time of flight periods, to the cumulative total of the blade periods over that selected number K of flight periods:

$$ND = \frac{\sum_{i=N-K}^{i=N} ToF_i}{\sum_{i=N-K}^{i=N} BP_i} \quad (2)$$

where: N is the blade or blade pulse identifier;
i is the summation index;
ND is the normalised distance; and
K is the selected number of blades.

Where there are missing or damaged blades resulting in a missing signal or signals;

$$ND = \frac{\sum_{i=N-K}^{i=N} ToF_i}{\sum_{i=N-(K-M)}^{i=N} BP_i} \quad (3)$$

where: N is the Blade Pulse identifier;
i is the summation index;
ND is the normalised distance;
K is the selected number of blades; and
M is the number of missing pulses Preferably, the selected number K of time of flight periods correspond to a single complete revolution of the shaft.

The above algorithm is concerned with the derivation of a single distance factor or correction factor (the normalised distance) between the sensors. It is also possible to derive a normalised distance (ie distance or correction factor) for each blade of a bladed shaft such as a gas turbine. This may significantly improve accuracy as the blade properties can affect the magnetic distance between the sensors.

The normalised distance for the Nth blade, $ND_N$ is the ratio of the measured time of flight ToF to a nominal or average blade period $NBP_N$ for a number of determined blade periods up to that measured time of flight period for that Nth blade:

$$NBP_N = \frac{1}{K} \sum_{i=N-K}^{N} BP_i$$

Where $NBP_N$ is the nominal blade period;
N is the blade pulse identifier;
i is the summation index;
BP is the blade period; and
K is the number of blades over which measurements are taken.

Preferably, the nominal blade period is determined over a single complete revolution (i.e. K corresponds to a single complete revolution of the shaft) of the shaft.

The normalised distance $ND_N$ for the Nth blade is then given by the ratio of the measured time of flight $ToF_N$ for that Nth blade to the nominal blade period $NBP_N$ for that same blade period:

$$ND_N = \frac{K \times ToF_N}{\sum_{i=N-K}^{i=N} BP_i} \quad (2')$$

where: N is the blade or blade pulse identifier;
i is the summation index;
$ToF_N$ is the time of flight
BP is the blade period
$ND_N$ is the normalised distance; and
K is the selected number of blades.

Where there are missing or damaged blades resulting in a missing signal or signals;

$$ND_N = \frac{K \times ToF_N}{\sum_{i=N-(K-M)}^{i=N} BP_i} \quad (3)$$

where: N is the Blade Pulse identifier;
i is the summation index;
ToF is the time of flight
BD is the blade period
$ND_N$ is the normalised distance;
K is the selected number of blades; and
M is the number of missing pulses The normalised distance can be determined continuously or simply repeatedly. The regularity of the calculation (and re-calculation) of the stored normalised distance depends on how much change there is believed to be between revolutions and how accurate the desired output. The more accurate the desired output and/or the more significant the rate of change, the more regular this re-calculation.

The normalised distance is stored in a memory, and is looked up for future measurements of time of flights and used to convert those time of flight measurements into an accurate rotational speed measurement. The normalised distance can be considered to be a distance factor which forms the basis of a speed calculation which takes account of movement of the sensors. The distance factor is a form of correction factor which corrects for the variations in magnetic distance between the sensors.

When the normalised distance is known, the measured time of flight period for the latest blade to pass between the sensors is measured and these values are used to calculate the rotational speed of the bladed shaft, in revolutions per minute (rpm):

$$\text{Engine Speed} = \frac{60 \times ND}{ToF(N) \times K}(rpm). \quad (4)$$

where: $T_oF_N$ is the latest measured Time of Flight Period,
ND is the normalised distance calculated from equation 2 or 3, and K is the number of blades per revolution.

As illustrated in FIG. 3, as each successive blade passes sensor 6, the value of the latest blade period is updated, as each successive blade passes between sensor 5 and sensor 6, the latest time of flight period is measured. This allows the sums of the blade periods and time of flight periods to be updated if necessary. Hence, the normalised distance value can also be updated and the finally, the shaft rotational speed calculated and updated.

A result of the system described above is that the shaft rotational speed can be calculated from a single blade time of flight period measurement and is therefore updated as each successive blade period and time of flight period is recorded. Shaft rotational speed can therefore be measured with a faster response time and a higher degree of accuracy than that which is achievable by known methods of speed measurement.

Figure 4:
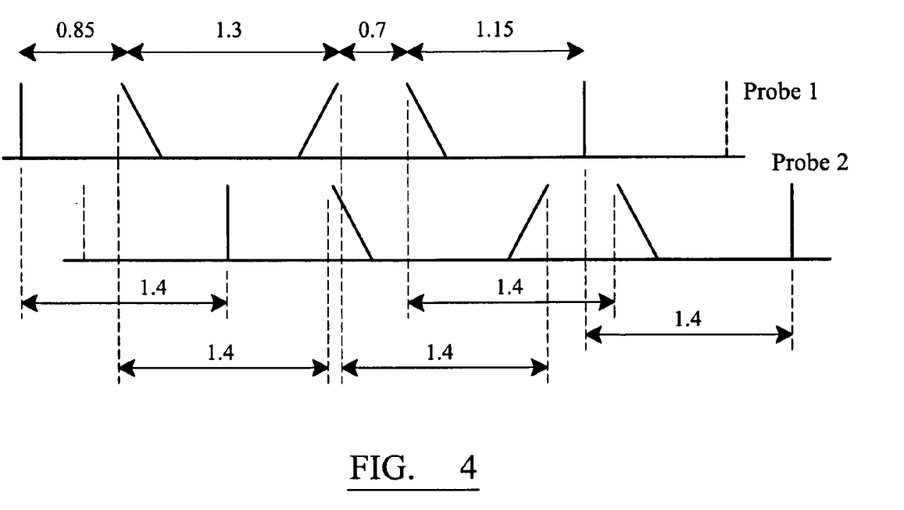
FIG. 4 is a diagram illustrating the effects of blade tip movement relative to each other (i.e blade jitter) on monitoring systems such as that of FIGS. 1 and 2.
Figure 5:
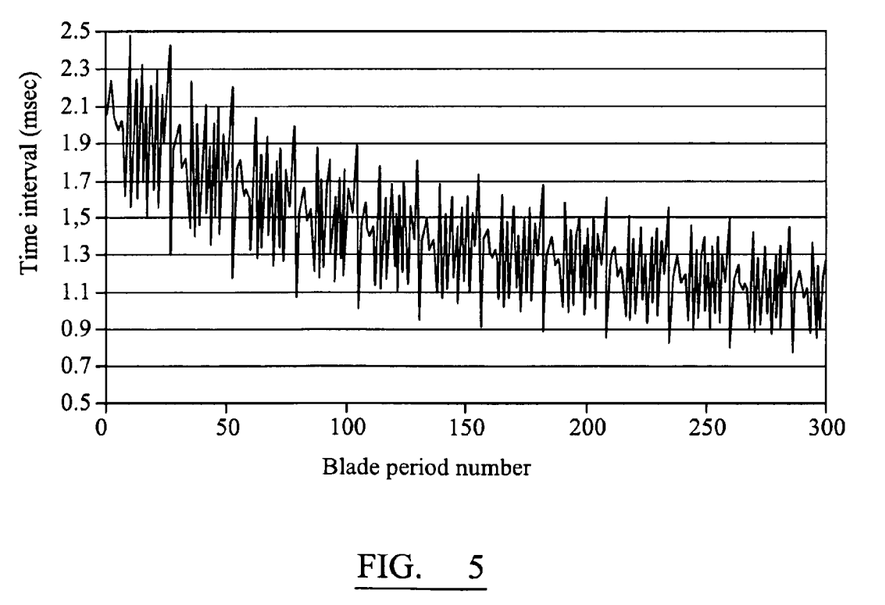
FIG. 5 illustrates a variation of time intervals between consecutive blades when a shaft such as that of FIG. 1 is accelerating at a rate of about 2000 rpm/s from a speed of about 1000 rpm.

As shown in FIGS. 1a and 4, blade jitter is caused by blades (or blade tips) not being in their nominal equally spaced positions 12. This offset from the nominal position results from the fact that blades are mounted on a pin and the forces acting thereon can cause the blades to pivot around the pin. This jitter causes the blade period times measured from blade to blade to differ from one blade to the next, causing it to appear as if the rotational speed is constantly changing. The speed change is not smooth and continuous, but appears as a repetitive and varying error as shown in FIG. 5. Taking measurements over one revolution reduces the effect of blade jitter—for every increase in blade separation caused by jitter of a particular blade, there is a corresponding decrease because as one blade, for example, moves closer to the preceding blade, it must move further away by the same distance from its following blade.

A further limitation of using the time of flight principle described above is that it can be only used where the blade jitter movement velocity during the time period, T, required for the blade to cover the distance, S, is several orders of magnitude smaller than the blade rotational velocity.

The calibration technique described above involves a comparison of the time of flight period measurements for each successive blade that passes between the sensors 5, 6, with the shaft speed measurements obtained from the cumulative total of the blade to blade period measurements recorded during a previous complete revolution of the shaft. The shaft speed over one complete revolution is calculated from the time period measurements for all of the blades fitted to the compressor disc to pass one of the sensors. The number of blades must therefore be counted to secure correct measurements.

In order to accurately calibrate the distance S, we have to know the number of blades. In operation, the speed sensors may not detect the presence of one or more blades and as a result, they will not generate a pulse signal. This may be caused by one or more blades being damaged (e.g. having a bent or broken tip), or the pulse amplitude generated by the sensors might be too small to be detected by the processing circuitry connected to the sensors. This condition shall be referred to as the presence of 'missing pulses'.

Figure 6:
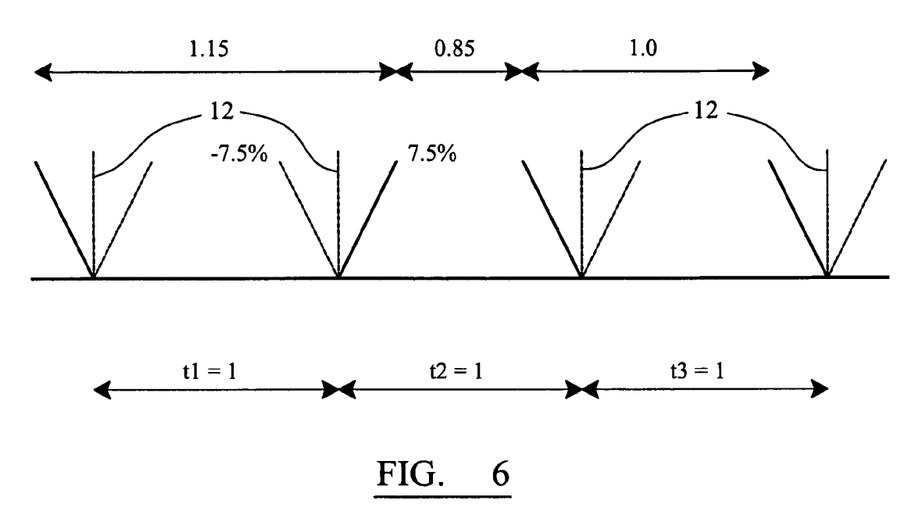
FIG. 6 is a diagram illustrating the effect of a missing pulse or blade, and blade jitter on monitoring systems such as that of FIGS. 1 and 2.
Figure 7:
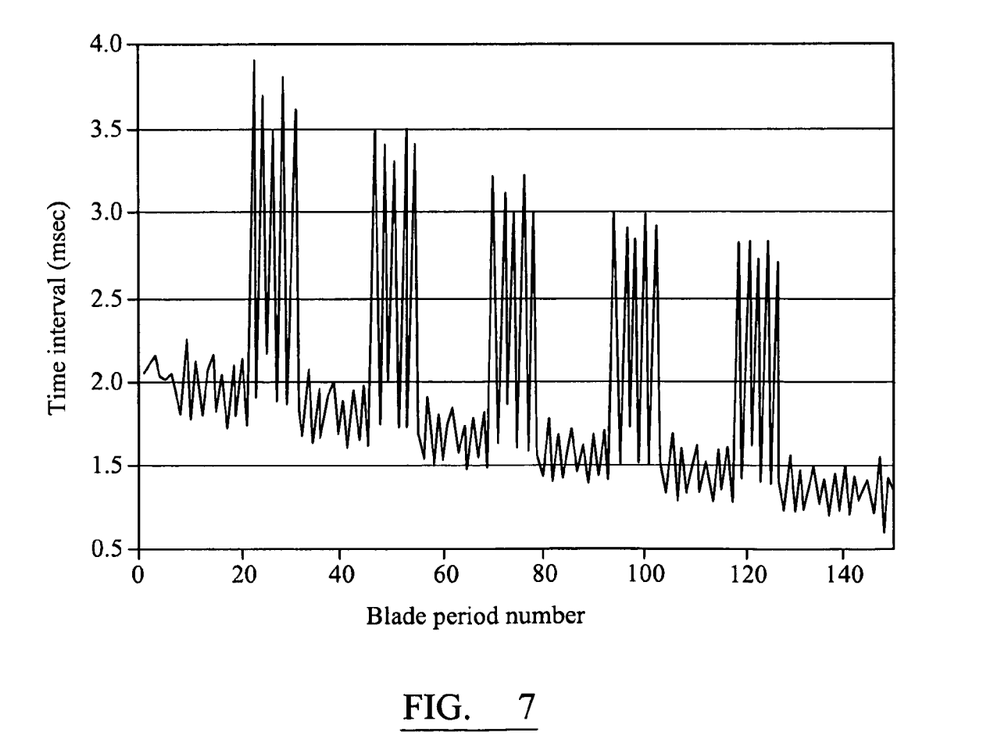
FIG. 7 illustrates a variation of time intervals between consecutive blades when a shaft such as that of FIG. 1, but with five missing blades, is accelerating at 2000 rpm/s from a speed of about 1000 rpm.

If one or more missing pulses are present, the apparent time between successive blades passing one of the sensors (e.g. sensor 6)—the blade period—appears much longer than the condition where there are no missing pulses (see FIG. 6). This results in a low shaft rotational speed calculation compared to when there are no missing pulses. It is therefore important to compensate for missing pulses when calculating shaft rotational speed.

To simplify the following description of the preferred embodiment, normalised times will be used, where '1' shall represent the nominal time period between perfectly positioned blades passing the sensors.

For example and with reference to FIGS. 4 and 6, if there is assumed to be ±7.5% blade jitter on each blade (i.e. blade jitter expressed as a percentage of nominal or theoretical blade separation), this will cause the blade period to vary between a minimum blade period of:

$$BP_{min}=1-2\times0.075=1-0.15=0.85 \quad (5)$$

and a maximum blade period of:

$$BP_{max}=1+2\times0.075=1+0.15=1.15 \quad (6)$$

However, when one missing pulse is present, as shown in FIG. 6, the normalised minimum blade period is calculated by:

$$BP_{min}=1+1-(2\times0.075)=1.85 \quad (7)$$

and a normalised maximum blade period is calculated by:

$$BP_{max}=1+1+2\times0.075=2.15 \quad (8)$$

Therefore, the presence of a single missing pulse gives a nominal normalised blade period of 2, two missing pulses give a nominal Blade Period BP of 3, and so on.

Various methods for detecting the number of missing pulses present in a number of measured blade periods are envisaged and shall now be considered in turn. In the following discussions of the methods, 'AV' is used for the number of blade periods over which an average blade period is taken, and 'M' is the total number of missing pulses present in that sample taken over AV blade periods (see FIG. 8).

Figure 8:
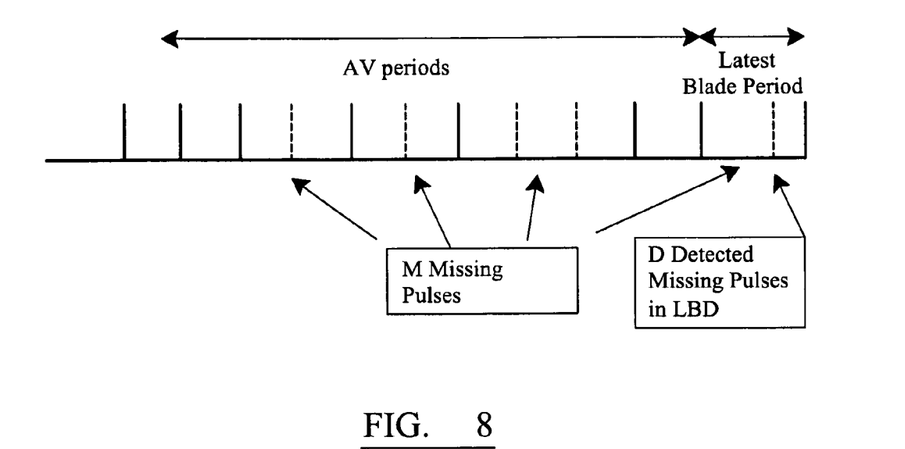
FIG. 8 is a diagram illustrating a pulse or signal train corresponding to the sensing of a position of a turbine blade having a number of missing pulses or signal peaks corresponding to, for example, missing, worn or damaged blades.

One method of detecting missing pulses is based on finding the ratio, R, of the latest blade period (LBP) to the average blade period over the last AV periods of measurements ($BP_{AV}$) (see FIG. 8). In this method, the AV number of periods does not include the latest blade period.

Figure 2B:
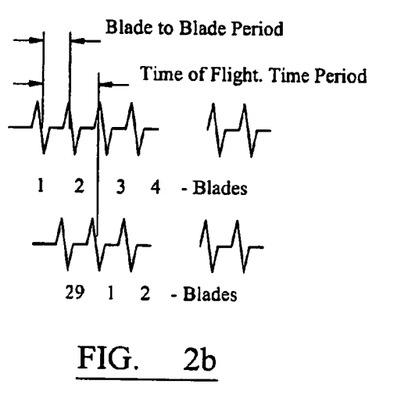

As each successive blade tip passes one of the sensors (say sensor 5 in FIGS. 2, 3), a pulse is generated and the attached circuitry measures the latest blade period LBP (the elapsed time between successive blades passing the same sensor) and these values are stored in the memory.

When a predetermined number AV of blades have been detected by the sensor, an average blade period over the AV periods is calculated.

If there are 'M' missing pulses in a compressor disc having 'K' blades and in the latest blade period, there are 'D' missing pulses (see FIG. 8), the latest blade period (LBP) is given by:

$$LBP = D + 1 \pm 2 \times j \quad (9)$$

where: j is the maximum value of blade jitter

The total of the blade periods to be averaged is:

$$T = AV + M \pm 2 \times j \quad (10)$$

The average blade period over the last AV periods is then:

$$BP_{AV} = T/AV \quad (11)$$

The values of LBP and $BP_{AV}$ are then used to calculate the Ratio, R, of the latest blade period (LBP) to the average blade period over the last AV periods of measurements ($BP_{AV}$) is then:

$$\text{Ratio} = LBP/BP_{AV} = (LBP/T) \times AV \quad (12)$$

This ratio is at a maximum when LBP has its largest value and T has its smallest value:

$$Ratio_{Max} = AV \times \frac{D + 1 + 2 \times j}{AV + M - 2 \times j} \quad (13)$$

This ratio is at a minimum when LBP has its smallest value and T has its largest value:

$$Ratio_{Min} = AV \times \frac{D + 1 - 2 \times j}{AV + M + 2 \times j} \quad (14)$$

Figure 9:
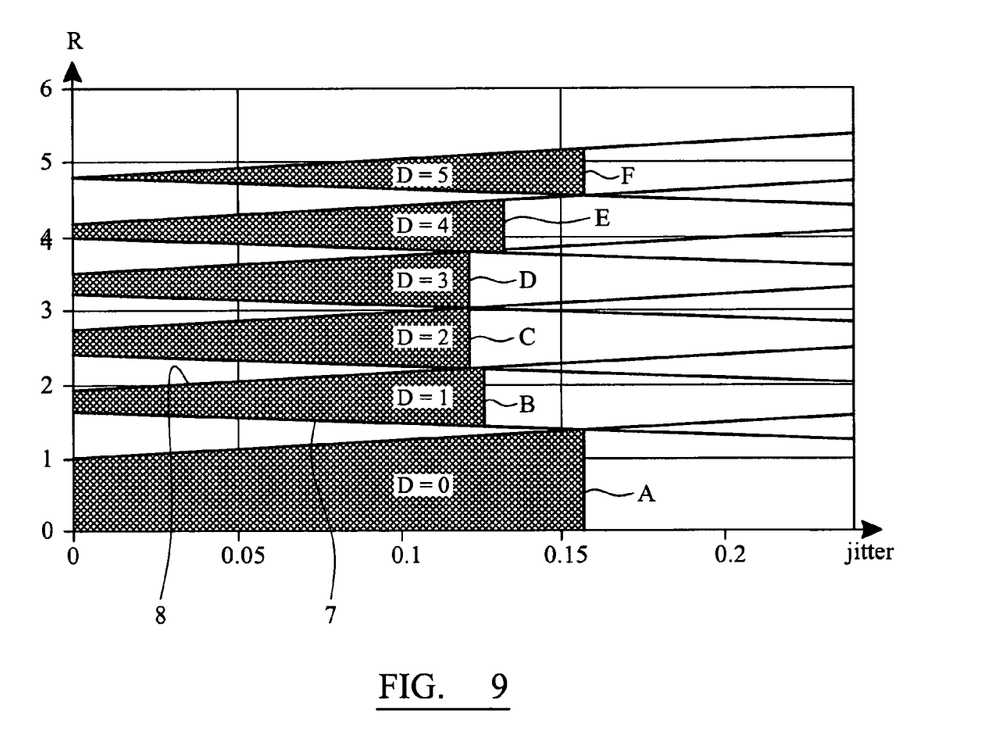
FIG. 9 is a graph illustrating, for a pulse or signal train such as that of FIG. 8, the dependence of the ratio of the latest blade period time to the average blade period time over the last AV periods on the total number of missing pulses, M, for different numbers of detected pulses, D, in the latest blade period, as a function of blade jitter.

By way of an example of the detection of the total number of missing pulses in AV blade periods, Equations 13 and 14 set out above have been used to calculate the $Ratio_{max}$ and $Ratio_{min}$ for various values of blade jitter and various values of D (number of missing pulses in last blade period) and M (number of missing pulses in a single revolution of compressor disc). FIG. 9 is a graph showing the relationship between the Ratio, R, and the jitter value, calculated for: AV=20, D=0 to 5 and M=0 to 5.

For each value of D, the 'relevant lines' on the graph are the outermost lines (e.g. lines 7, 8 for D=1, where 7 is the line corresponding to D=1, M=5, minimum, and 8 is the line corresponding to D=1, M=1, maximum) plotted for that value of D, (see FIG. 9).

As each successive blade passes sensor 6, the value of R (see equation 12) for the latest blade period is calculated by the system's data processors. FIG. 9 illustrates the calculations carried out by software implementing the invention to create a look-up table listing the number of missing pulses which correspond to calculated vales of the ratio R and values of blade jitter. If the calculated value of R (when plotted on the graph of FIG. 9) lies in the region before the relevant lines for one D value cross those for another D value—i.e. where the value of R lies within one of hatched regions A, B, C, D, E or F of FIG. 9, the value of D can be ascertained from a look-up table or database corresponding to the graph of FIG. 9 as there is only one possible region or outcome.

For example (see FIG. 9), if when AV=20 and M is between 0 and 5, the value of jitter is 0.12, and the calculated value of the ratio, R, is 1.9, R falls within hatched region B of FIG. 9, the graph shows that the value for D (missing pulses in latest blade period) is therefore 1. However, if when AV=20 and M is between 0 and 5 and the value of jitter is say 0.2, the value of the ratio R will fall to the right of hatched region B, beyond the maximum allowable jitter limit. As a result, D cannot be ascertained from the graph of FIG. 9 or an equivalent look-up table. Experiments suggest that jitter values are not that great so software algorithms with look-up tables matching the hatched values of FIG. 9 (and table 1 below) can be used as such situations are unlikely to arise.

For a turbine compressor disc having, say, twenty-nine blades, AV must be less than 29-M, but the larger it is the better resolution it has, so 20 is a compromise. The M and D values are selected as 0 to 5 because, in practice, when 5 out of 29 blades are damaged, turbine vibrations are so large that the turbine must be shut down. M and/or D could however be equal to 6, 7, 8 or 9.

To simplify the process described above of determining the value of D, the value of D that corresponds to a range of values of R for the latest blade period can be put in a table format as shown below in Table 1.

TABLE 1

Calculation of D for given ranges of R

| Range of values of ratio | Max. jitter value | No. of missing pulses, D |
| --- | --- | --- |
| 0 < R < 1.348 | 0.156 | 0 |
| 1.34 < R < 2.18 | 0.128 | 1 |
| 2.18 < R < 2.98 | 0.12 | 2 |
| 2.98 < R < 3.75 | 0.12 | 3 |
| 3.75 < R < 4.49 | 0.131 | 4 |
| 4.49 < R | 0.159 | 5 |

As described above, it is only possible to determine D for a value of R where the jitter value does not exceed the given maximum jitter value given in Table 1, which corresponds to the jitter limit of the hatched regions A to F (FIG. 9). If the value of blade jitter exceeds this maximum permissible jitter value, the calculations cannot be performed.

The maximum value of jitter for a given turbine is established during a separate test. In practice, the blade jitter experienced by the turbine blades during shaft rotation is much smaller than the limits given in Table 1. Software implementing the invention can therefore work with a look-up table matching table 1.

To establish the number of missing pulses, M, in a full revolution of the bladed shaft, the calculations have to be performed K–ΣD times, where: K is the number of blades attached to the compressor disc, and ΣD is the sum of detected missing pulses in the Latest Blade Period. D is measured during every measurement, so the sum of Ds should give M, but the calculations are performed K−ΣD times to try and avoid counting the same Ds twice.

Figure 10:
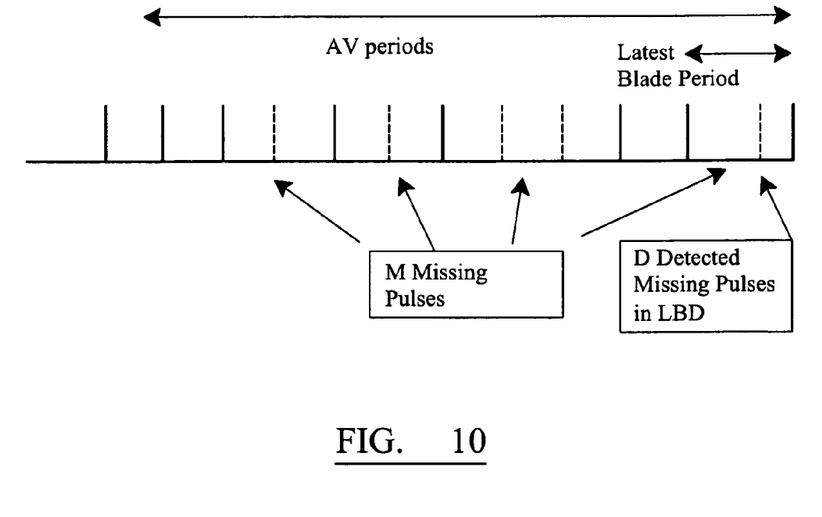
FIG. 10 is a diagram similar to that of FIG. 8, but showing the presence of M missing pulses in AV periods, with D missing pulses being present in the latest blade period and the AV periods including the latest blade period.

In a second method of detecting the presence of missing pulses, the number of blade periods to be averaged, AV, includes the Latest Blade Period as shown in FIG. 10. Therefore, the total AV time period may include more missing pulses than in the previously described method as, in the subject method, AV includes both any missing pulses M and any missing pulses D.

In this method, the cumulative total of the blade periods to be averaged is:

$$T = AV + (M-D) \pm 2 \times j \quad (15)$$

The average blade period is calculated by:

$$BP_{AV} = T/AV \quad (16)$$

The ratio of the latest blade period to the average blade period over the last AV periods of measurements is then calculated by:

$$\text{Ratio} = LBP/BP_{AV} = LBP/T \times AV$$

Again, this ratio is at a maximum when LBP has its largest value and T has its smallest value (Equation 10) and the ratio is at a minimum when LBP has its smallest value and T has its largest value (Equation 11).

$$\text{Ratio}_{Max} = AV \times \frac{D + 1 + 2 \times j}{AV + M - D - 2 \times j} \quad (17)$$

$$\text{Ratio}_{Min} = AV \times \frac{D + 1 - 2 \times j}{AV + M - D + 2 \times j}. \quad (18)$$

The same process as that described for the above method is then used to ascertain the values of D and M for use in calculating the shaft rotational speed.

When the blade jitter values are larger than the maximum permissible values listed in Table 1, or it is possible that more than 5 missing pulses may be present in K periods, it may be more reliable to use a method based on the measurements of blade to blade times using the predictor-limiter method of GB 2,414,300. The predictor-limiter arrangement of GB 2,414, 300 works by predicting blade time periods from historical sensed blade time periods. Only sensed blade time periods which fall within a defined range of acceptable values are used to calculate predicted time periods with blade time periods outside the range of acceptable values being ignored as likely to correspond to a missing pulse or blade. The predicted blade time periods are used to calculate the speed of the shaft.

The predictor limiter-method removes missing pulse blade periods and therefore blade to blade time measurements give us a Reference Period.

Using this method, the number of missing pulses present in one period is obtained by calculation of the ratio:

$$R = \frac{\text{Latest Blade Period}}{\text{Reference Period}} \quad (19)$$

The latest blade period is the elapsed time between pulses produced by successive blades passing a single sensor and is calculated by:

$$LBP = D + 1 \pm 2 \times j \quad (20)$$

where: D is the number of missing pulses, and
j is the jitter value.

The Reference Period is obtained using predictor-limiter calculations as described in GB 2,414,300. In normalised notation, the reference period is equal to 1, hence the ratio of Equation 19 is simply equal to the latest blade period.

The calculations must be performed K−ΣD times to establish M as for method 1 described above.

Figure 11:
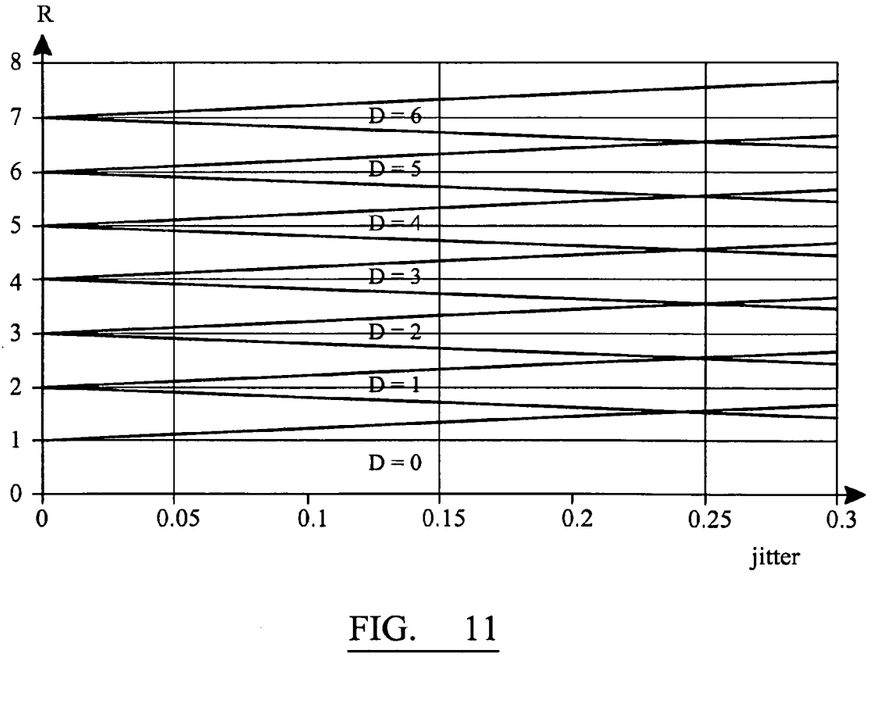
FIG. 11 is a graph showing calculated values of the ratio of the latest blade period time to the average blade period time over the last AV periods for different numbers of detected missing pulses, D, as a function of jitter using the predictor limiter method described in GB 2, 414, 300.

The results of calculations of the ratios of equation 19 are shown in FIG. 11 and Table 2.

TABLE 2

Calculation of D for ranges of the ratio, R

| Range of Values of Ratio | Max. Jitter range | No. of missing pulses D |
|---|---|---|
| 0 < R < 1.5 | 0.25 | 0 |
| 1.5 < R < 2.5 | 0.25 | 1 |
| 2.5 < R < 3.5 | 0.25 | 2 |
| 3.5 < R < 4.5 | 0.25 | 3 |
| 4.5 < R < 5.5 | 0.25 | 4 |
| 5.5 < R < 6.5 | 0.25 | 5 |
| 6.5 < R | 0.25 | 6 |

As with the previous methods of determining the number of missing pulses, the value of D is only admissible where the maximum blade jitter value is not exceeded. In practice, blade jitter of 0.25 is never observed, hence the value of D should always be ascertainable from Table 2. Software implementing the invention can therefore work with an equivalent look-up table.

Whichever method of determining the number of missing pulses present is employed, the result is the total number of missing pulses, M, that result from a complete revolution of the bladed shaft. As shown in the flow diagram of FIG. 3, when the value of M has been determined, the cumulative total blade period over a total revolution of the bladed shaft can be calculated, i.e. the sum of the individual blade periods for K-M blades, where K is the total number of blades on the shaft and can be counted.

Preferred features of embodiments of the invention in its various aspects are set out in the following numbered paragraphs:

1 A system for monitoring the rotational speed of a gas turbine shaft having a number of electrically conductive spaced features on and/or rotating with shaft, the system including:
  i) a magnet for generating a magnetic flux pattern in the path of said spaced features;
  ii) two spaced eddy current sensors for sensing the movement of said spaced features past the respective sensors, each said sensor including an eddy current detector element to be positioned adjacent said path to detect magnetic fields generated by eddy currents generated in each said spaced feature as it moves through the flux pattern, and induce a voltage in each sensor output, the voltage varying with variations in the eddy current sensed by the respective sensors so as to create a voltage signal pulse corresponding to the passage of a feature past each sensor;
  iii) a timer for determining the time period between voltage signal pulses generated by the same feature as it passes between the two sensors;
  iv) distance determination means determining a measure of the distance between the points at which said features generate a respective signal pulse at each of said sensors;
  v) means for updating the distance determination as the distance changes over time; and vi) speed calculation means for calculating speed from the time period of element (iii) and the distance of element (iv).

2 A system according to numbered paragraph 1 including:
(a) first and second eddy current sensors for sensing movement of said features;
(b) means for measuring the time of flight between a first signal generated as a first feature passes the first sensor and a second signal generated as the first feature passes the second sensor;
(c) means for determining the total time for a selected number of features to pass the first and second sensors;
(d) means for measuring the time between a third signal generated by a feature as it passes one of the sensors and a fourth signal generated as the next feature passes the same one of the sensors;
(e) means for determining the total time for the selected number of features to pass the respective sensor of step (d);
(f) means for determining a correction factor consisting of the ratio of the total time of step (c) to the total time of step (e); and
(g) memory to store the correction factor; and
(h) means to apply the correction factor to measured times of flight.

3 A system according to numbered paragraph 2 wherein the correction factor is periodically updated.

4 A system according to numbered paragraph 3 wherein the correction factor ND is given by the equation:

$$ND \frac{\sum_{i=N-K}^{i=N} ToF_i}{\sum_{i=N-K}^{i=N} BP_i}$$

where N is the feature or feature pulse identifier;
i is the summation index;
ToF is the measured time of flight for each respective feature;
BP is the time between the third and fourth signals for each respective pair of features; and
K is the selected number of features 5 A system according to numbered paragraph 4, wherein the features are evenly spaced around the shaft.

6 A system according to numbered paragraph 4, wherein the features are irregularly spaced around the shaft and the selected number of features corresponds to a complete revolution of the shaft.

7 A system according to numbered paragraph 5 wherein the spaced features are the teeth of a phonic wheel coupled to and rotating with the gas turbine shaft.

8 A system according to numbered paragraph 5 wherein the spaced features are either compressor or turbine blades mounted on the gas turbine shaft.

9 A system according to numbered paragraph 1 wherein the magnet is a permanent magnet.

10 A system according to numbered paragraph 1 wherein the magnet is a coil of electrically conductive material connected to an a.c. voltage supply.

11 A method for monitoring the rotation speed of a gas turbine shaft having a number of electrically conductive spaced features on and/or rotating with shaft, the method including:

a) generating a magnetic flux pattern in the path of said spaced features;
b) providing two spaced eddy current sensors;
c) sensing the movement of said spaced features past the respective sensors, by detecting the magnetic fields caused by eddy currents generated in each said spaced feature as it moves through the flux pattern, and thereby inducing a voltage in each sensor output, the voltage varying with variations in the current sensed by the respective sensors so as to induce a voltage signal corresponding to the passage of a feature past each sensor;
d) determining the time period between the signals induced by the same feature as it passes between the two sensors;
e) determining a measure of the distance between the points at which said features induce a respective signal at each of said sensors;
f) updating the distance determination as the distance changes over time; and
g) calculating speed from the time period of element (d) and the distance of element (e).

12) A method according to numbered paragraph 11 including the steps of:
a) providing first and second eddy current sensors for sensing movement of said features;
b) measuring the time of flight between a first signal induced as a first feature passes the first sensor and a second signal generated as the first feature passes the second sensor;
c) determining the total time for a selected number of features to pass the first and second sensors;
d) measuring the time between a third signal generated by a feature as it passes one of the sensors and a fourth signal generated as the next feature passes the same one of the sensors;
e) determining the total time for the selected number of features to pass the respective sensor of step (d);
f) determining a correction factor consisting of the ratio of the total time of step (c) to the total time of step (e);
g) storing the correction factor; and
h) applying the correction factor to measured times of flight.

13) A method according to numbered paragraph 12 wherein the correction factor is periodically updated.

14) A method according to numbered paragraph 13 wherein the correction factor ND is given by the equation:

$$ND \frac{\sum_{i=N-K}^{i=N} ToF_i}{\sum_{i=N-K}^{i=N} BP_i}$$

where N is the feature or feature pulse identifier;
i is the summation index;
ToF is the measured time of flight for each respective feature;
BP is the time between the third and fourth signals for each respective pair of features; and
K is the selected number of features.

15) A method according to numbered paragraph 14, wherein the features are evenly spaced around the shaft.

16) A method according to numbered paragraph 15, wherein the features are irregularly spaced around the shaft and the selected number of features corresponds to a complete revolution of the shaft.

17) A method according to numbered paragraph 15, wherein the spaced features are the teeth of a phonic wheel coupled to and rotating with the gas turbine shaft.

18) A method according to numbered paragraph 15, wherein the spaced features are either compressor or turbine blades mounted on the gas turbine shaft.

19) A system for monitoring the rotational speed of a shaft having a number of spaced features on and/or rotating with the shaft, including:
  (i) first and second sensors for sensing movement of said features;
  (ii) means for measuring the time of flight between a first signal generated as a selected feature passes the first sensor and a second signal generated as the selected feature passes the second sensor;
  (iii) means for measuring the time between a third signal generated by a feature as it passes one of the sensors and a fourth signal generated as the next feature passes the same one of the sensors;
  (iv) means for determining average time for a selected number of features to pass the respective sensor of step (iii);
  (v) means for determining a distance factor representative of the distance between the first and second sensors consisting of the ratio of the time of step (ii) to the average time of step (iv); and (vi) memory to store the distance factor; and
  (vii) means to apply the distance factor to subsequent measured times of flight of that selected feature so as to determine the speed of the shaft.

20) A system according to numbered paragraph 19 wherein a distance factor is determined for each feature on the shaft.

21) A system according to numbered paragraph 19 wherein the average time of step (iii) for the selected number of features to pass the sensor is taken over a single complete revolution of the shaft.

22) A system according to numbered paragraph 19 wherein the distance factor is periodically updated.

23) A system according to any of numbered paragraph 19 wherein the distance factor is a normalised distance $ND_N$ for the Nth feature on the shaft given by the equation:

$$ND_N = \frac{K \times ToF_N}{\sum_{i=N-(K-M)}^{i=N} BP_i}$$

where N is the feature or feature pulse identifier;
i is the summation index;
$ToF_N$ is the measured time of flight for the Nth feature;
BP is the time between the third and fourth signals for each respective pair of features; and
K is the selected number of features 24) A system according to numbered paragraph 19, wherein the features are evenly spaced around the shaft.

25) A system according to numbered paragraph 19 wherein the features are irregularly spaced around the shaft and the selected number of features corresponds to a complete revolution of the shaft.

26) A system according to numbered paragraph 19 for measuring the rotational speed of a gas turbine shaft.

27) A system according to numbered paragraph 24 wherein the spaced features are the teeth of a phonic wheel coupled to and rotating with the gas turbine shaft.

28) A system according to numbered paragraph 24 wherein the spaced features are either compressor or turbine blades mounted on the gas turbine shaft.

29) A system according to numbered paragraph 27 or 28 wherein the distance factor is a normalised distance and $ND_N$ is given by the equation:

$$ND_N = \frac{K \times ToF_N}{\sum_{i=N-(K-M)}^{i=N} BP_i}$$

where N is the Blade or tooth Pulse identifier;
i is the summation index;
$ToF_N$ is the measured time of flight for the Nth blade or tooth;
BP is the time between pulses corresponding to successive blades or teeth passing one of the sensors;
K is the selected number of blades or teeth; and
M is the number of missing pulses or signal peaks from a signal train representing the shaft blades or phonic wheel teeth.

30) A system according to numbered paragraph 19 wherein a correction factor representing a normalised distance between the sensors is applied to the time taken for one of said features to move between the two sensors.

31) A method for monitoring the rotational speed of a shaft having a number of spaced features on and/or rotating with the shaft, including the steps of:
  (i) measuring the time of flight between a first signal generated as a first feature passes a first sensor and a second signal generated as the first feature passes a second sensor;
  (ii) measuring the time between a third signal generated by a feature as it passes one of the sensors and a fourth signal generated as the next feature passes the same one of the sensors;
  (iii) determining the average time of step (ii) for a selected number of features to pass the respective sensor of step (ii);
  (iv) determining a distance factor for the selected feature consisting of the ratio of the time of step (ii) to the average time of step (iii); and
  (vi) applying the distance factor to measured times of flight so as to determine the speed of the shaft.

32) A method according to numbered paragraph 31 wherein the distance factor is determined for each feature on the shaft.

33) A method according to numbered paragraph 31 wherein the average time of step (iii) for the selected number of features to pass the sensor is taken over a single complete revolution of the shaft.

34) A method according to numbered paragraph 31 wherein the distance factor is periodically updated.

35) A method according to numbered paragraph 31 wherein the distance factor $ND_N$ for the Nth feature on the shaft given by the equation:

$$ND_N = \frac{K \times ToF_N}{\sum_{i=N-K}^{i=N} BP_i}$$

where N is the feature or pulse identifier;
i is the summation index;
$ToF_N$ is the measured time of flight for the Nth feature;
BP is the time between the third and fourth signals for each respective pair of features; and
K is the selected number of features.

36) A method according to numbered paragraph 31, wherein the features are evenly spaced around the shaft.
37) A method according to numbered paragraph 31, wherein the features are irregularly spaced around the shaft and the selected number of features corresponds to a complete revolution of the shaft.
38) A method according to numbered paragraph 31 for measuring the rotational speed of a gas turbine shaft.
39) A method according to numbered paragraph 36 wherein the spaced features are the teeth of a phonic wheel coupled to and rotating with the gas turbine shaft.
40) A method according to numbered paragraph 36 wherein the spaced features are either compressor or turbine blades mounted on the gas turbine shaft.
41) A method according to numbered paragraph 39 or 40 wherein the distance factor is a normalised distance and $ND_N$ is given by the equation:

$$ND_N = \frac{K \times ToF_N}{\sum_{i=N-(K-M)}^{i=N} BP_i}$$

where N is the Blade or tooth \pulse identifier;
i is the summation index;
$ToF_N$ is the measured time of flight for the Nth blade or tooth;
BP is the time between pulses corresponding to successive blades or teeth passing one of the sensors;
K is the selected number of blades or teeth; and
M is the number of missing pulses or signal peaks from a signal train representing the shaft blades or phonic wheel teeth.

42) A method according to numbered paragraph 31 wherein a distance factor representing a normalised distance between the sensors is applied to the time taken for one of said features to move between the two sensors.
43) A data processor including software for running a routine or routines for carrying out the method of numbered paragraph 11.
44) A data processor including software for running a routine or routines for carrying out the method of numbered paragraph 31.

The invention claimed is:

1. A system for monitoring the rotational speed of a gas turbine shaft having a number of electrically conductive spaced features on and/or rotating with shaft, the system including:
   (i) a magnet for generating a magnetic flux pattern in the path of said spaced features;
   (ii) two spaced eddy current sensors for sensing the movement of said spaced features past the respective sensors, each said sensor including an eddy current detector element to be positioned adjacent said path to detect magnetic fields generated by eddy currents generated in each said spaced feature as it moves through the flux pattern, and induce a voltage in each sensor output, the voltage varying with variations in the eddy current sensed by the respective sensors so as to create a voltage signal pulse corresponding to the passage of a feature past each sensor;
   (iii) a timer for determining the time period between voltage signal pulses generated by the same feature as it passes between the two sensors;
   (iv) distance determination means for determining a measure of the distance between the points at which said features generate a respective signal pulse at each of said sensors;
   (v) means for updating the distance determination as the distance changes over time; and
   (vi) speed calculation means for calculating speed from the time period of element (iii) and the distance of element (iv).

2. A system according to claim 1, wherein the distance determining means comprises:
   (a) means for determining the total time for a selected number of said spaced features to pass the first and second sensors;
   (b) means for measuring the time between a third signal generated by a feature as it passes one of the sensors and a fourth signal generated as the next feature passes the same one of the sensors;
   (c) means for determining the total time for the selected number of features to pass the respective sensor of step (b); and
   (d) means for determining a correction factor consisting of the ratio of the total time of step (a) to the total time of step (c); and
   wherein said speed calculation means includes:
   a memory to store the correction factor; and
   means to apply the correction factor to measured times of flight.

3. A system according to claim 2 wherein the correction factor is periodically updated.

4. A system according to claim 3 wherein the correction factor ND is given by the equation:

$$ND = \frac{\sum_{i=N-K}^{i=N} ToF_i}{\sum_{i=N-K}^{i=N} BP_i}$$

where N is the feature or feature pulse identifier;
i is the summation index;
ToF is the measured time of flight for each respective feature;
BP is the time between the third and fourth signals for each respective pair of features; and
K is the selected number of features.

5. A system according to claim 4, wherein the features are evenly spaced around the shaft.

6. A system according to claim 5 wherein the spaced features are the teeth of a phonic wheel coupled to and rotating with the gas turbine shaft.

7. A system according to claim 5 wherein the spaced features are either compressor or turbine blades mounted on the gas turbine shaft.

8. A system according to claim 1 wherein the magnet is a permanent magnet.

9. A system according to claim 1 wherein the magnet is a coil of electrically conductive material connected to an a.c. voltage supply.

10. A method for monitoring the rotation speed of a gas turbine shaft having a number of electrically conductive spaced features on and/or rotating with shaft, the method including:
generating a magnetic flux pattern in the path of said spaced features;
providing two spaced eddy current sensors;
sensing the movement of said spaced features past the respective sensors, by detecting the magnetic fields caused by eddy currents generated in each said spaced feature as it moves through the flux pattern, and thereby inducing a voltage in each sensor output, the voltage varying with variations in the current sensed by the respective sensors so as to induce a voltage signal corresponding to the passage of a feature past each sensor;
determining the time period between the signals induced by the same feature as it passes between the two sensors;
determining a measure of the distance between the points at which said features induce a respective signal at each of said sensors;
updating the distance determination as the distance changes over time; and
calculating speed from the time period of element (d) and the distance of element (e).

11. A system for monitoring the rotational speed of a shaft having a number of spaced features on and/or rotating with the shaft, including:
(i) first and second sensors for sensing movement of said features;
(ii) means for measuring the time of flight between a first signal generated as a selected feature passes the first sensor and a second signal generated as the selected feature passes the second sensor;
(iii) means for measuring the time between a third signal generated by a feature as it passes one of the sensors and a fourth signal generated as the next feature passes the same one of the sensors;
(iv) means for determining average time for a selected number of features to pass the respective sensor of step (iii);
(v) means for determining a distance factor representative of the distance between the first and second sensors consisting of the ratio of the time of step (ii) to the average time of step (iv); and (vi) memory to store the distance factor; and
(vii) means to apply the distance factor to subsequent measured times of flight of that selected feature so as to determine the speed of the shaft.

12. A system according to claim 11 wherein a distance factor is determined for each feature on the shaft.

13. A system according to claim 11 wherein the average time of step (iii) for the selected number of features to pass the sensor is taken over a single complete revolution of the shaft.

14. A system according to claim 11 wherein the distance factor is periodically updated.

15. A system according to any of claim 11 wherein the distance factor is a normalised distance $ND_N$ for the Nth feature on the shaft given by the equation:

$$ND_N = \frac{K \times ToF_N}{\sum_{i=N-(K-M)}^{i=N} BP_i}$$

where N is the feature or feature pulse identifier;
i is the summation index;
$ToF_N$ is the measured time of flight for the Nth feature;
BP is the time between the third and fourth signals for each respective pair of features; and
K is the selected number of features.

16. A system according to claim 11 for measuring the rotational speed of a gas turbine shaft.

17. A system according to claim 11 wherein a correction factor representing a normalised distance between the sensors is applied to the time taken for one of said features to move between the two sensors.

18. A method for monitoring the rotational speed of a shaft having a number of spaced features on and/or rotating with the shaft, including the steps of:
(i) measuring the time of flight between a first signal generated as a first feature passes a first sensor and a second signal generated as the first feature passes a second sensor;
(ii) measuring the time between a third signal generated by a feature as it passes one of the sensors and a fourth signal generated as the next feature passes the same one of the sensors;
(iii) determining the average time of step (ii) for a selected number of features to pass the respective sensor of step (ii);
(iv) determining a distance factor for the selected feature consisting of the ratio of the time of step (ii) to the average time of step (iii); and
(vi) applying the distance factor to measured times of flight so as to determine the speed of the shaft.

19. A method according to claim 18 wherein the distance factor is determined for each feature on the shaft.

20. A method according to claim 18 wherein the distance factor $ND_N$ for the Nth feature on the shaft given by the equation:

$$ND_N = \frac{K \times ToF_N}{\sum_{i=N-K}^{i=N} BP_i}$$

where N is the feature or pulse identifier;
i is the summation index;
$ToF_N$ is the measured time of flight for the Nth feature;
BP is the time between the third and fourth signals for each respective pair of features; and
K is the selected number of features.

* * * * *